(12) United States Patent
Aoki et al.

(10) Patent No.: US 6,650,482 B2
(45) Date of Patent: Nov. 18, 2003

(54) VEHICLE-INSTALLED HEAD-UP DISPLAY DEVICE

(75) Inventors: Kunimitsu Aoki, Shizuoka (JP); Go Nakamura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/171,580

(22) Filed: Jun. 17, 2002

(65) Prior Publication Data

US 2003/0016451 A1 Jan. 23, 2003

(30) Foreign Application Priority Data

Jul. 17, 2001 (JP) ........................................ 2001-216474

(51) Int. Cl.[7] ............................................. G02B 27/14
(52) U.S. Cl. ............................ 359/630; 359/633; 345/7
(58) Field of Search ........................ 359/29–640; 345/7; 340/461

(56) References Cited

U.S. PATENT DOCUMENTS

| | | | | |
|---|---|---|---|---|
| 5,013,135 A | * | 5/1991 | Yamamura | 359/630 |
| 5,035,473 A | * | 7/1991 | Kuwayama et al. | 359/13 |
| 5,376,917 A | * | 12/1994 | Yoshimoto et al. | 340/438 |
| 5,815,072 A | * | 9/1998 | Yamanaka et al. | 340/461 |

FOREIGN PATENT DOCUMENTS

JP            62-66822            4/1987

* cited by examiner

*Primary Examiner*—Ricky Mack
*Assistant Examiner*—Brand N Thomas
(74) *Attorney, Agent, or Firm*—Armstrong, Westerman & Hattori, LLP

(57) ABSTRACT

One of two images is selectively displayed on a single displaying screen of a display 11. The light of the displayed image is reflected from a mirror 13a and a half-mirror 13b toward a first reflective area 21a or second reflective area 21b of a translucent reflecting film 21 which is located in a field of view ahead of a driver's seat. An optical path is exchanged so that when the one image is displayed by the display, only the light of the one image reflected by the mirror 13a is incident on the first reflective area 21a, whereas when the other image is displayed by the display, only the light of the second image is incident on the second reflective area 21b. Two images are reflected from the translucent reflecting film 21 and visually recognized as a single virtual image ahead of a windshield 20 by a driver. In this configuration, a head-up display capable of displaying a larger image can be installed in a vehicle without being upsized.

11 Claims, 9 Drawing Sheets

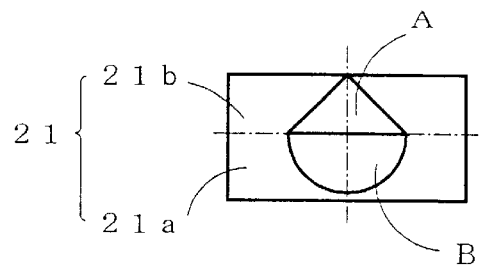
FIG. 3
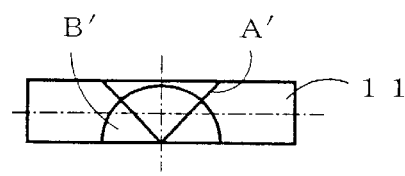
FIG. 4
| 2 1 | 2 1 b | 2 1 a | 2 1 b | 2 1 a | 2 1 b | ... |
|---|---|---|---|---|---|---|
| 1 4 b | OPENED | CLOSED | OPENED | CLOSED | OPENED | ... |
| 1 4 a | CLOSED | OPENED | CLOSED | OPENED | CLOSED | ... |
| 1 1 | ▽ | ⌒ | △ | ⌣ | △ | ... |
FIG. 5

VEHICLE-INSTALLED HEAD-UP DISPLAY DEVICE

BACKGROUND OF THE INVENTION

1. Field of the Invention

This invention relates to a vehicle-installed head-up display device, and more particularly to a vehicle-installed head-up display device which reflects a displayed image by a translucent reflecting means arranged in a visual field ahead of a driver and permits the driver to recognize a displayed image visually as a virtual image ahead of a windshield.

2. Description of the Related Art

An example of such a device is shown in FIG. 10. In FIG. 10, a light-emitting display 111 of e.g. a liquid crystal or fluorescent display tube is installed in a dashboard (not shown) so that its displaying screen is oriented forward of the vehicle. A reflecting mirror 113 is arranged oppositely to and at an angle formed with the displaying screen of the display 11. The light of the image displayed on the display 111 is incident on the reflecting mirror 113 through an enlarging optical system 112 such as a Fresnel lens.

The reflecting mirror 113 reflects the light of the displayed image toward the inner face on the side of a passenger room of a windshield (front glass) 20 of the vehicle. The inner face is coated with a translucent reflecting film 21 capable of increasing the reflectance of the inner face as the occasion demands to raise the brightness of the displayed image reflected by the reflecting mirror 113. Therefore, the driver can see the displayed image which is imaged far by the enlarging optical system 112 as an image 111' and reflected by a translucent reflecting film 21 as an enlarged virtual image 111" far ahead of the windshield.

Although not shown, the light emitting display 111, enlarging optical system 112 and reflecting mirror 113 are installed as a displaying unit within a single case. Its outer size depends on the size (viewing angle) of the displayed image, displaying distance by the enlarging optical system and a visible range 30. The visible range must be assured within an eye range 31 which varies according to a driving posture and physics of the driver. Assuming that the displaying distance is 2–3 m, in order to cover 95% to 99% of the eye range, the display unit must have an increased outer size and hence is difficult to be arranged in a dashboard having a limited space.

In order to obviate such an inconvenience, traditionally, since the visible range of a driver does not move so greatly during running, only a certain visible range is assured. For example, as shown in FIG. 11, an adjusting mechanism is added which serves to move the reflecting mirror 113 linearly so that its distance from the displaying screen of the display 111 varies. Otherwise, as shown in FIG. 12, another adjusting mechanism is added which serves to rotate the reflecting mirror 113 so that its angle formed with the display 111 varies. Thus, the visible range 30 can be moved within the eye range 31.

As another example of such a device, the structure as shown in FIG. 13 was proposed. In FIG. 13, a light-emitting display 211 of e.g. a liquid crystal or fluorescent display tube is arranged within a dashboard of the vehicle (not shown) so that its displaying screen is oriented toward the rear of the vehicle. A reflecting mirror 212 is arranged apart from the display 211 so that the reflecting face is opposite to the displaying screen. The reflecting mirror 212 serves to reflect the light of the displayed image (hereinafter referred to as "image light") toward the displaying screen of the display 211. The reflecting mirror 212 may be a concave mirror.

A translucent reflecting plate 213 is arranged between the display 211 and the reflecting mirror 212. The translucent reflecting mirror 213 may be a half mirror which is inclined at a prescribed angle so as to transmit the image light from the display 211 and to reflect the light of the displayed image reflected by the reflecting mirror 212 toward the inner face on the side of a passenger room of a windshield (front glass) 20 of the vehicle through the opening above the dash board. The inner face maybe coated with a translucent reflecting film 21 capable of increasing the reflectance of the inner face as the occasion demands to raise the brightness of the displayed image reflected by the reflecting mirror 213.

In accordance with such a configuration, the driver can visually recognize the displayed image on the display finally reflected by the windshield 20 as a virtual image 211" which is imaged as a virtual image enlarged by the curvature of the windshield at a position corresponding to the sum of the distances between the display 211 and the reflecting mirror 212, between the reflecting mirror 212 and the translucent reflecting mirror 213 and between the reflecting mirror 213 and the windshield 20.

However, in order to improve installation capability in the vehicle, any of the proposals cannot miniaturize the display device without reducing the size of the displayed image. Further, where the displayed image with a further increased size is required, an existing unit having only the function of adjusting the eye range cannot satisfy the requirement. Namely, an increased size of the unit which cannot be installed in the vehicle is necessary.

SUMMARY OF THE INVENTION

In view of the above circumstance, an object of this invention is to provide a vehicle-installed head-up display device which can be further miniaturized and improve installation capability in a vehicle.

Another object of this invention is to provide a vehicle-installed head-up display device which can display a large image without being up-sized.

In accordance with this invention, there is provided a a vehicle-installed head-up display device comprising:

final reflecting means located in a field of view ahead of a driver's seat, the final reflecting means being translucent;

displaying means capable of selectively displaying one of first and second images by light emission on a signal displaying screen;

first reflecting means for reflecting light of a displayed image toward a first reflective area of the final reflecting means;

second reflecting means for reflecting light of the displayed image toward a second reflective area of the final reflecting means, the second reflective area being adjacent to the first reflective area; and optical path exchanging means for exchanging an optical path so that when the first image is displayed by the displaying means, only the light of the first image reflected by the first reflecting means is incident on the first reflective area, whereas when the second image is displayed by the displaying means, only the light of the second image is incident on the second reflective area, wherein the first and second images one of which is selectively displayed are reflected by the first reflective area and the second reflective area of the final reflecting means so that a driver can visually recognize these images as virtual images ahead of a windshield.

In this configuration, the two images, one of which is selectively displayed on the single displaying screen of the displaying means, are reflected by the translucent reflecting means arranged in the field of view ahead of the driver's seat and can be visually recognized by the driver.

In a preferred embodiment, selective display of the first and second displayed images is made in a period shorter that the afterimage of eyes, and in synchronism with the selective display, the optical path is exchanged by the optical path changing means whereby the displayed images are visually recognized as a single virtual image.

In this configuration, the two displayed images can be visually recognized as a single virtual image by the driver.

In accordance with this invention, there is provided a vehicle-installed head-up display device comprising:

final reflecting means located in a field of view ahead of a driver's seat, the final reflecting means being translucent;

displaying means capable of selectively displaying one of two images by light emission on a signal displaying screen;

first reflecting means for reflecting light of a displayed image toward a first reflective area of the final reflecting means;

second reflecting means for transmitting a part of light of the displayed image and reflecting the remainder of the light toward a second reflective area of the final reflecting means, the second reflecting means being located between the first reflecting means and the displaying means, the second reflective area being adjacent to the first reflective area, and the second reflecting means being translucent;

first shutter means for controlling transmission/non-transmission of the light of the displayed image reflected by the first reflecting means; and second shutter means for controlling transmission/non-transmission of the light of the displayed image reflected by the second reflecting means, wherein one of the first shutter means and second shutter means is opened and the other thereof is closed according to each image selectively displayed by the displaying means, and the displayed image transmitted by the first shutter means or the second shutter means is reflected by the first reflective area or the second reflective area so that a driver can visually recognize the displayed image as a virtual image ahead of a windshield.

In this configuration, the two images, one of which is selectively displayed on the single displaying screen of the displaying means, are reflected by the first and second reflecting means and thereafter reflected by the translucent reflecting means arranged in the field of view ahead of the driver's seat and can be visually recognized by the driver.

In a preferred embodiment, the first shutter means is located between the first reflecting means and the first reflective area of the final reflecting means, and the second shutter means is located between the second reflecting means and the second reflective area of the final reflecting means.

In this configuration, these first and second shutter means can be designed as a single shutter means which can be alternately opened and closed apparently.

In a preferred embodiment, the head-up display device comprises enlarging optical means located between the displaying means and the second reflecting means.

In this configuration, the two displayed images are equally enlarged and imaged at equal far positions.

In a preferred embodiment, the two displayed images are upper and lower elements divided from a single image, when the upper element is displayed by the displaying means, the first shutter means is closed and the second shutter means is opened, whereas the lower upper element is displayed by the displaying means, the first shutter means is opened and the second shutter means is closed, and relative positions of the first reflecting means and the second reflecting means are located so that these upper and lower elements are imaged as an single integral virtual image.

In this configuration, the displayed image of information having a size twice as large as the image of information which can be once displayed by the displaying means can be visually recognized by the driver.

In a preferred embodiment, a lower end point of the displayed image reflected by the first reflecting means and an upper point of that reflected by the second reflecting means accord to each other in their reflecting optical paths.

In this configuration, continuity of the two displayed images can be kept.

In a preferred embodiment, the head-up display device further comprises:

means for adjusting the directions of the light of the displayed images reflected by the first reflecting means and the second reflecting means toward the final reflecting means so that the position of the virtual image to be visually recognized ahead of the windshield is adjusted; and means for adjusting the position of the shutter means so that the transmission/non-transmission of the light of the displayed images can be controlled.

In this configuration, the visible range can be adjusted within the eye range without disordering the relative positions of the two displayed images.

In accordance with this invention, there is provided a vehicle-installed head-up display device comprising:

final reflecting means located in a field of view ahead of a driver's seat, the final reflecting means being translucent;

displaying means capable of selectively displaying one of first and second-images by light emission on a signal displaying screen;

intermediate reflecting means for reflecting light of the displayed image;

first translucent reflecting means for reflecting light of the displayed image toward a first reflective area of the final reflecting means, the first translucent reflecting means being located between the displaying means and the intermediate reflecting means;

second translucent reflecting means for reflecting light of the displayed image toward a second reflective area of the final reflecting means, the second reflective area being adjacent to the first reflective area, the second translucent reflecting means being located between the displaying means and the intermediate reflecting means; and first shutter means for controlling transmission/non-transmission of the light of the displayed image reflected by the first translucent reflecting means; and second shutter means for controlling transmission/non-transmission of the light of the displayed image reflected by the second reflecting means, wherein one of the first shutter means and second shutter means is opened and the other thereof is closed according to each image selectively displayed by the displaying means, and the displayed image transmitted by the first shutter means or the second shutter means is reflected by the first reflective area or the second reflective area so that a driver can visually recognize the displayed image as a virtual image ahead of a windshield.

In this configuration, the two displayed images are finally reflected by the final translucent reflecting means are imaged at a position far ahead of the windshield corresponding to the sum of the distances from the displaying means and the intermediate reflecting means, from the intermediate reflecting mans to the first and second reflecting means and from the first and second reflecting means to the final translucent reflecting means. The driver can visually recognize these virtual images.

In a preferred embodiment, the intermediate reflecting means is a concave mirror. Therefore, the two images are equally enlarged.

In a preferred embodiment, the first shutter means is located between the first translucent reflecting means and the first reflective area of the final reflecting means, and the second shutter means is located between the second translucent reflecting means and the second reflective area of the final reflecting means.

In this configuration, these first and second shutter means can be designed as a single shutter means which can be alternately opened and closed apparently.

The above and other objects and features of the invention will be more apparent from the following description taken in conjunction with the accompanying drawings.

BRIEF DESCRIPTION OF THE DRAWINGS

FIG. 3 is a plan view of a translucent reflecting film on the inner face of a windshield and an image reflected by this reflecting film and visually recognized;

FIG. 4 is a plan view of the displaying screen of a display and an image displayed thereon;

FIG. 5 is a table showing the status of each of respective parts of the display device which varies according to the operation of a display device;

DESCRIPTION OF THE PREFERRED EMBODIMENTS

Figure 1:
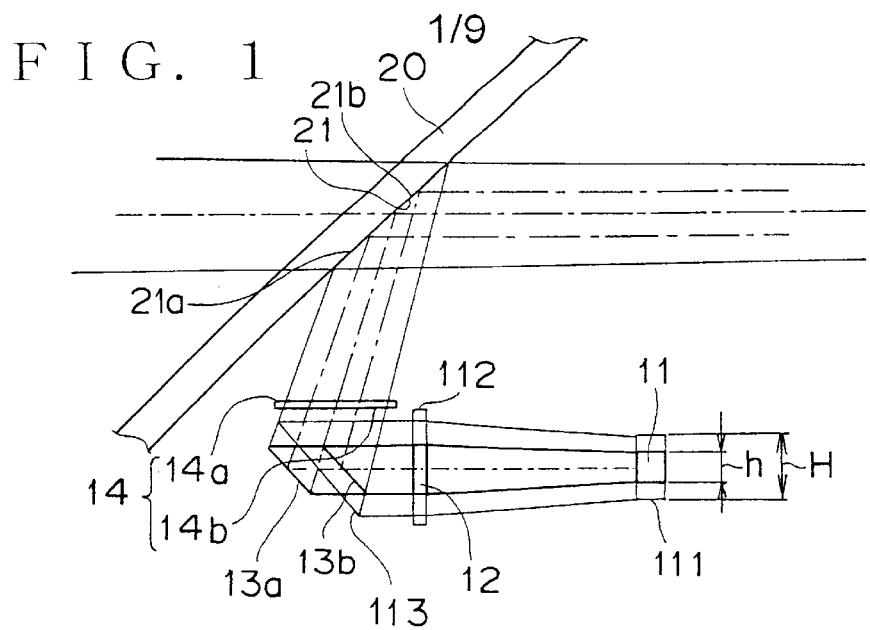
FIG. 1 is a side view of an embodiment of a vehicle-installed head-up display device according to this invention.

Now referring to the drawings, an explanation will be given of various embodiments of a vehicle-installed head-up display device according to this invention.

FIG. 1 is a side view of an embodiment of a vehicle-installed head-up display device according to this invention.

In FIG. 1, a light-emitting display (hereinafter referred to as simply "display") 11 is installed within a dashboard of a vehicle (not shown) so that the its displaying screen is oriented toward the front of the vehicle. The display 11 may be a displaying means such as a liquid crystal or a fluorescent display tube. The display 11 is capable of selectively displaying one of two displayed images by light emission on a single displaying screen.

A mirror 13a is arranged oppositely to and at an angle formed with the displaying screen of the display 11. The mirror 13a is arranged on an optical axis of an enlarging optical system 12 located between the display 11 and the mirror 13a. The mirror 13a serves as a first reflecting means which receives the image light from the display 11 through the enlarging optical system 12.

A half-mirror 13b is arranged on the optical axis of the enlarging optical system 12 and between the mirror 13a and the enlarging optical system 12. The mirror 13b is arranged apart by a prescribed distance from and in parallel to the mirror 13a. Namely, the half-mirror 13b is also arranged oppositely to and at an angle formed with the displaying screen of the display 11. The half-mirror 13b serves as a second reflecting means.

The mirror 13a and the half-mirror 13b serve to reflect the image light from the display 11 toward the inner face on the side of a passenger room of a vehicle windshield (front glass) through an opening in the upper face of the dashboard (not shown), respectively. The above inner face is coated with a translucent reflecting film 21. The translucent reflecting film 21 serves as a final reflecting means which reflect two displayed images reflected by the mirror 13a and half-mirror 13b, respectively toward the eyes of the driver within a field of view ahead of the driver's seat.

A liquid crystal shutter (shutter means) 14 is arranged between the mirror 13a and half-mirror 13b and the translucent reflecting mirror 21. The liquid crystal shutter 14 is opened/closed to control the transmission or non-transmission of the image light reflected by the mirror 13a and the half-mirror 13b.

The mirror 13a reflects the image light toward a first reflective area 21a of the translucent reflecting film 21. The half-mirror 13b transmits a part of the image light and reflects the remaining image light toward a second reflective area 21b of the translucent reflecting film 21. The second reflective area 21b is located above the first reflective area. Thus, the displayed images are imaged far by the enlarging optical system 12, reflected by the mirror 13a and half-mirror 13b and further reflected by the first reflective area 21a and the second reflective area 21b. The driver can visually recognize the pertinent displayed images as two enlarged virtual images far ahead of the windshield.

Figure 2:
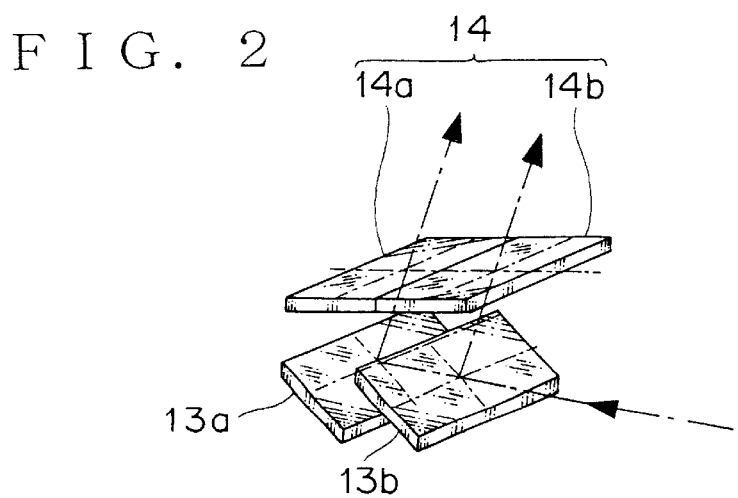
FIG. 2 is a perspective view of the details of a portion a shown in FIG. 1.

As seen from FIG. 2, the liquid crystal shutter 14 is composed of a shutter 14a (first shutter means) and another shutter 14b (second shutter means). The shutter 14a is opened/closed to control the transmission/non-transmission of the image light reflected by the mirror 13a whereas the shutter 14b is opened/closed to control the transmission/non-transmission of the image light reflected by the half-mirror 13b. The shutters 14a and 14b are controlled according to the image selectively displayed on the display 11 so that one of them is opened and the other is closed. Since the displayed images are alternately transmitted by the shutters 14a and 14b and reflected by the reflective areas 21a and 21b, they are visually recognized as virtual images by the driver.

The two images one of which is selectively displayed by the display 11 are an inverted triangle A' and an inverted semicircle B' as shown in FIG. 4 when a single image composed of a triangle A and a semicircle B is divided into an upper part and a lower part as shown in FIG. 3. Although the inverted triangle A' and inverted semicircle B' are illustrated in a superposed manner in FIG. 4, actually, either one of them is selectively displayed on the display 11.

Where the display 11 displays the inverted triangle corresponding to the upper part of the image as shown in FIG. 3, the shutter (first shutter means) 14a closes whereas the shutter (second shutter means) 14b opens. Where the display 11 displays the inverted semicircle corresponding to the lower part of the image as shown in FIG. 3, the shutter (first shutter means) 14a opens whereas the shutter (second shutter means) 14b closes.

The selective display of the two images on the display 11 is made at a period shorter than the afterimage time of eyes, and the open/close of the shutters 14a and 14b is controlled synchronously with the selective display. Therefore, the two images one of which is selectively displayed by the display 11 are reflected twice by the mirror 13a and half-mirror 13b and the reflective areas 21a and 21b. The images thus formed are flipped vertically so that they are visually recognized by the driver as a single virtual as shown in FIG. 3 ahead of the windshield. It should be noted that the images displayed by the display are not vertically flipped by the Fresnel lens (enlarging optical system).

In order to make the single virtual image as described the relative positions of the mirror 13a and the half-mirror 13b must be set so that the optical path of the lower end point of the displayed image reflected by the mirror 13a coincides with that of the upper end point of the displayed image reflected by the mirror 13b. In addition, the boundary between the shutter areas 14a and 14b must coincide with these optical paths.

Although not shown, the display 11, enlarging optical system 12, mirror 13a, half-mirror 13b and liquid crystal shutter 14 are installed as a unit within a single case.

Referring to FIG. 5, an detailed explanation will be given of the operation of the vehicle-installed head-up display device. While the inverted triangle A' is displayed on the display 11, the shutter areas 14a and 14b are closed and opened, respectively. Therefore, the displayed inverted triangle A' passes only the shutter 14b and reflected by the reflective area 21b. Thus, the driver visually recognizes a triangle A reversed from the inverted triangle A' as a virtual image ahead of the windshield.

When the displayed image of the display 11 is changed from the inverted triangle A' into an inverted semi-circle B', the shutter areas 14a and 14b are opened and closed, respectively. Therefore, the displayed inverted semi-circle B' passes only the shutter 14a and reflected by the reflective area 21a. Thus, the driver visually recognizes a semi-circle B reversed from the inverted semi-circle B' as a virtual image ahead of the windshield.

The changing of the displayed image and opening/closing the shutter areas are executed within the afterimage time of eyes. Thus, the driver can visually recognize the single virtual image as shown in FIG. 3 ahead of the windshield.

As described above, in accordance with this embodiment, since the two images one of which is displayed individually and selectively on the display 11 are reflected by the reflective areas 21a and 21b at different positions and visually recognized as the single virtual image, the display and the reflecting means may be half as high as the case where both images simultaneously are displayed on the single display. Therefore, the height of the display unit can be reduced. In other words, a larger image can be displayed with the display having the same size.

In the embodiment described above, the adjusting mechanism for moving the visible range within the eye range, was not explained. However, the vehicle-installed head-up display device as shown in FIG. 1 must be designed so that the relationship between two displayed images reflected by the translucent reflecting film 21 is not disordered by adjusting the visible range within the eye range.

Figure 6:
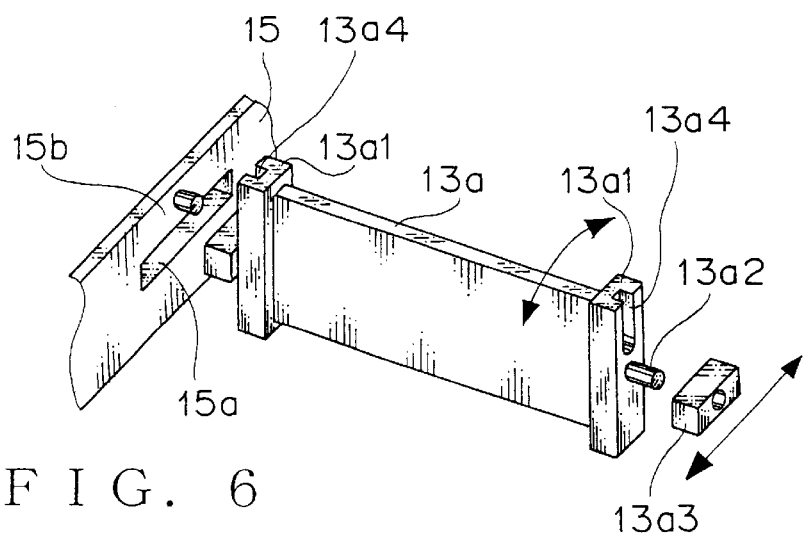
FIG. 6 is a perspective view of a portion of an adjusting mechanism which is applied to the display device of FIG. 1.
Figure 7:
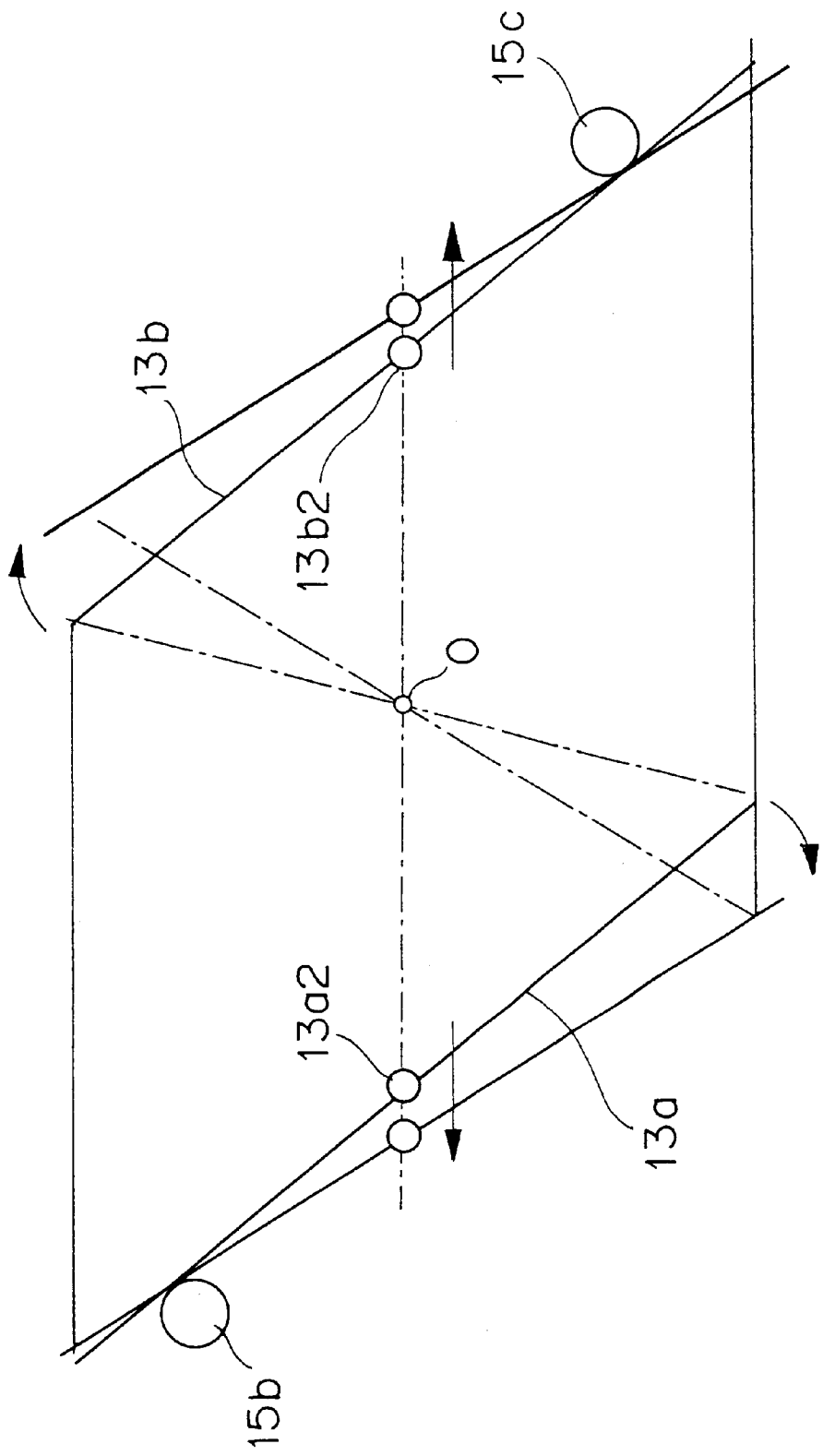
FIG. 7 is a conceptual view of a reflecting direction adjusting mechanism of FIG. 6.
Figure 8:
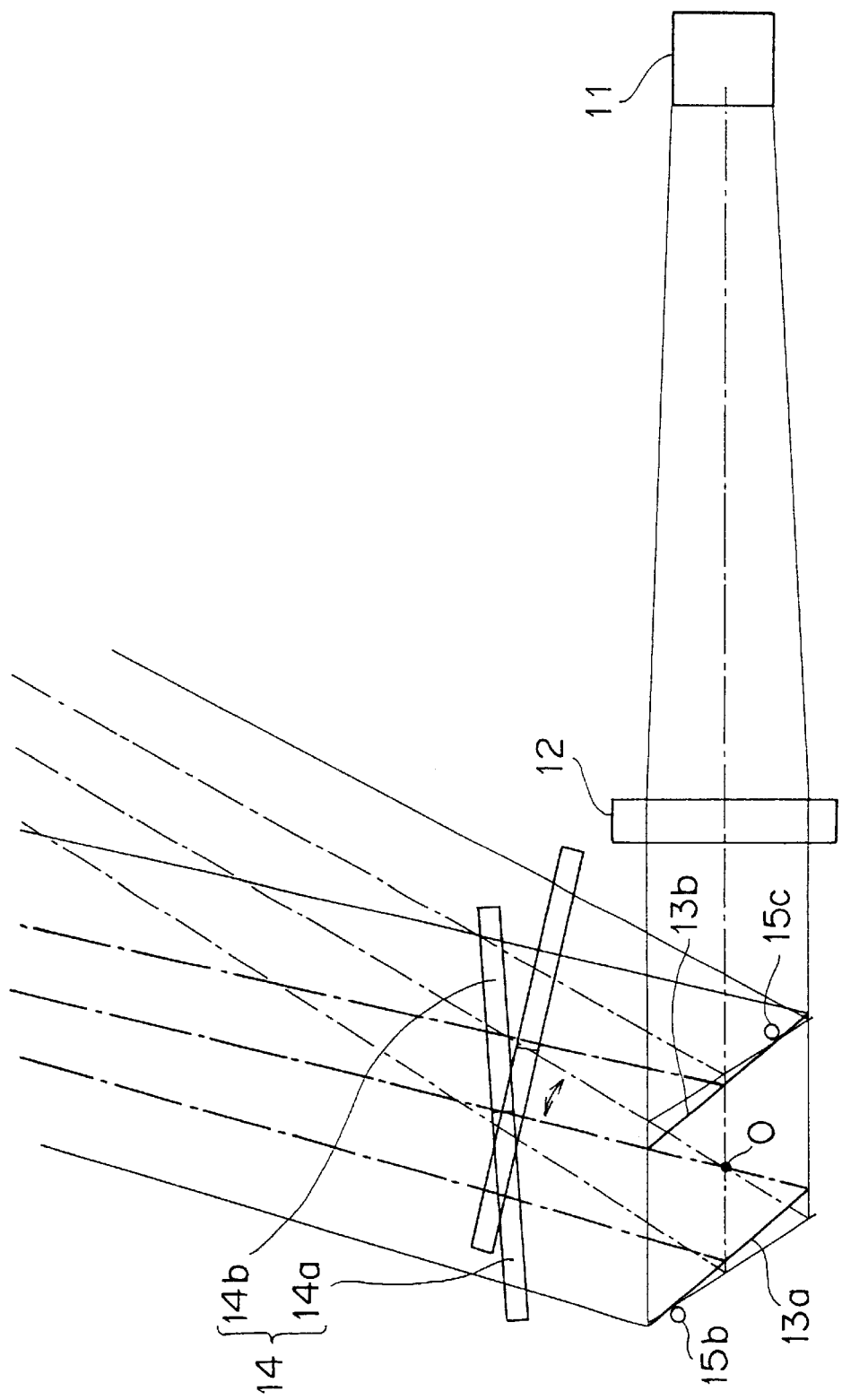
FIG. 8 is a conceptual view of the adjusting mechanism having the reflecting direction adjusting mechanism of FIG. 7 and a shutter position adjusting mechanism.

FIGS. 6 to 8 show the adjusting mechanism which can satisfy the above requirement and is preferably applied to this invention. As seen from FIG. 6, the mirror 13a is supported by supporting pieces 13a1 on both sides. The supporting piece 13a1 is equipped with a rotating shaft 13a2 which protrudes at a center point in a vertical direction and extends along the mirror face. The rotating shaft 13a2 is slidably supported in a sliding 13a3 which is guided slidably in a linear guiding groove 15a made on the wall 15 of the unit case. The supporting piece 13a1 of the mirror 13a has a guiding groove 13a4. A sliding shaft 15b which is located at a position above the linear guiding groove 15a is formed so as to protrude from the wall 15. The sliding shaft 15b is fit in the guiding groove 13a4.

In the configuration described above, as seen from FIG. 7, when the sliding piece 13a3 moves in the linear guiding groove 15a in a direction of an arrow, the mirror 13a moves upward along the sliding shaft 15b while rotating around the rotary shaft 13a2. Thus, the mirror 13a stands so that the angle formed by the reflecting face with the optical axis varies, thereby varying the reflecting direction of the image light. In FIG. 7, when the sliding piece 13a3 moves in a direction opposite to the arrow, the mirror falls.

Although not shown in FIG. 6, like the mirror 13a, the half-mirror 13b is supported by supporting pieces on both sides. The supporting piece is equipped with a rotating shaft 13b2 which protrudes at a center point in a vertical direction and extends along the mirror face. The rotating shaft 13b2 is slidably supported in a sliding 13a3 which is guided slidably in a linear guiding groove (not shown) made on the wall of the unit case. The supporting piece of the half-mirror 13b has a guiding groove (not shown). A sliding shaft 15c which is located at a position below the linear guiding groove is formed so as to protrude from the wall. The sliding shaft 15c is fit in the guiding groove.

In the configuration described above, as seen from FIG. 7, when the sliding piece of the half-mirror 13b moves in the linear guiding groove in a direction of an arrow, the half-mirror 13b moves upward along the sliding shaft 15c while rotating around the rotary shaft 13b2. Thus, the half-mirror 13b stands so that the angle formed by the reflecting face with the optical axis varies, thereby varying the reflecting direction of the image light. In FIG. 7, when the sliding piece moves in a direction opposite to the arrow, the half-mirror 13b falls.

As described above, the mirror 13a and half-mirror 13b are not rotated only around the corresponding rotary shafts, but they are rotated while their rotary shafts are moved at opposite directions. For this reason, a change in the height of the mirror 13a and half-mirror 13b due to the their rotation can be reduced. Incidentally, the above opposite movement can be realized by providing the corresponding sliding pieces with screws threaded in opposite directions.

The above mechanism constitutes means for adjusting the directions of the image reflected by the mirror 13a and the half-mirror 13b toward the translucent reflecting film 21 so that the position of the virtual image to be visually recognized ahead of the windshield 20 is adjusted.

As described above, the boundary between the shutter areas 14a and 14b coincide with the optical path of the lower end point of the displayed image reflected by the mirror 13a coincides with that of the upper end point of the displayed image reflected by the half-mirror 13b. In order to keep such a relationship even when the mirror 13a and the half-mirror 13b are rotated, as shown in FIG. 8, the liquid crystal shutter 14 may be rotated around the intersecting point O of the optical paths before and after rotation. The above mechanism constitutes means for adjusting the position of said shutter means so that the transmission/non-transmission of the light of the displayed images can be controlled. Incidentally, the liquid crystal shutter 14 is rotated in synchronism with the rotation of the mirror 13a and half-mirror 13b.

The luminance of the displayed image after having been reflected by the mirror 13a is preferably equal to that of the displayed image after having been reflected by the half-mirror 13b. Therefore, assuming that the displaying luminance of the display 11 is Ho, the reflectance of the mirror 13a is Ar, the transmissivity of the half-mirror 13b is Bt and the reflectance thereof is Br, Ar, Bt and Br are preferably set so that Ho×Ar×Bt=Ho×Br. For example, if Ar=100% and Bt=Br=50%, both luminances become equal.

In FIG. 1, the light emitting display 111, enlarging optical system 112 and reflecting mirror 113 which are used in the conventional display device are also illustrated. As understood from the comparison of these elements and the elements in this invention, the entire size of the display device according to this invention can be greatly reduced to be as half as that of the conventional display device (For example, the height of the display can be reduced from H to h).

Figure 9:
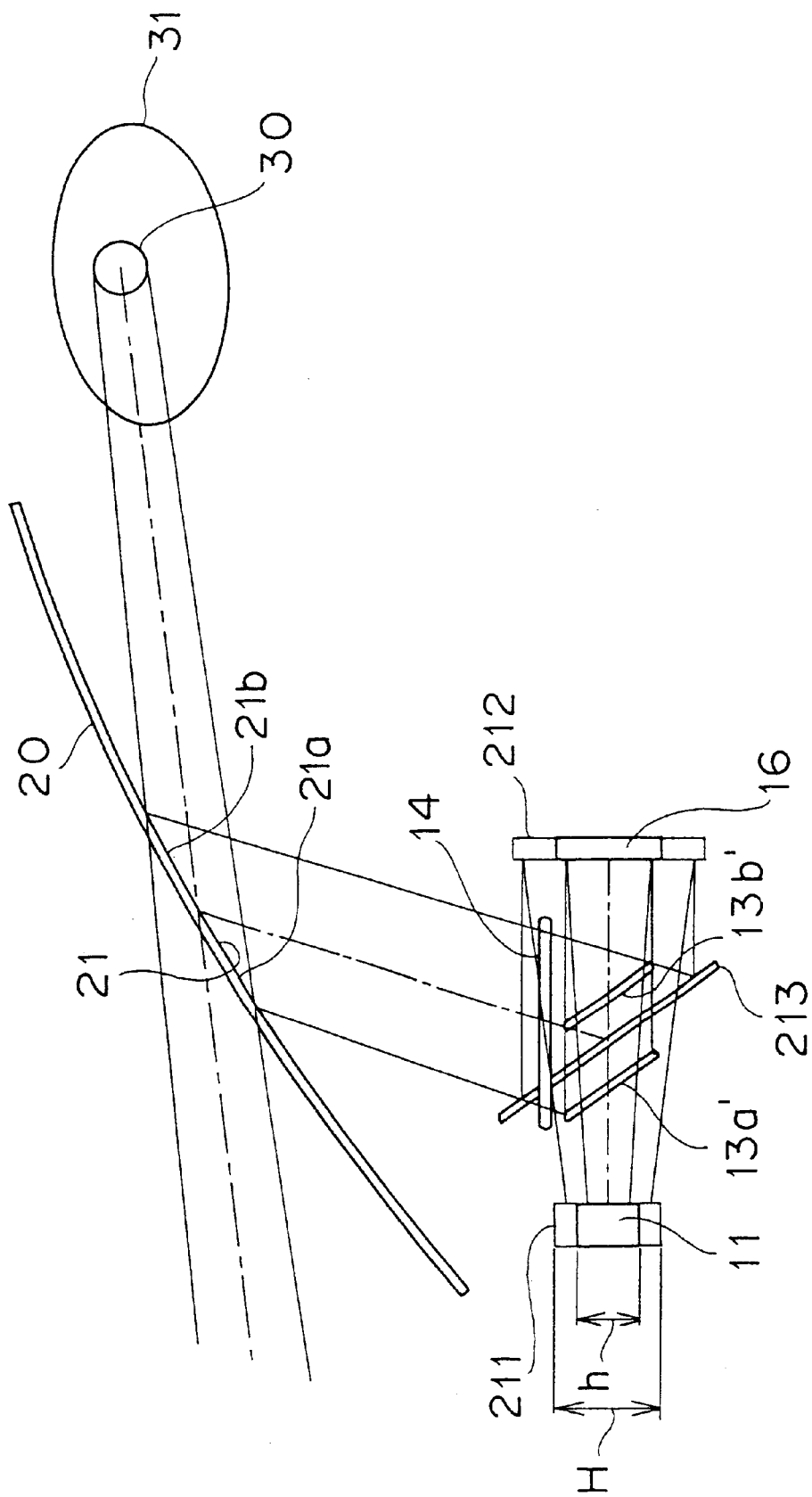
FIG. 9 is a side view of another embodiment of a vehicle-installed head-up display device according to this invention.
Figure 10:
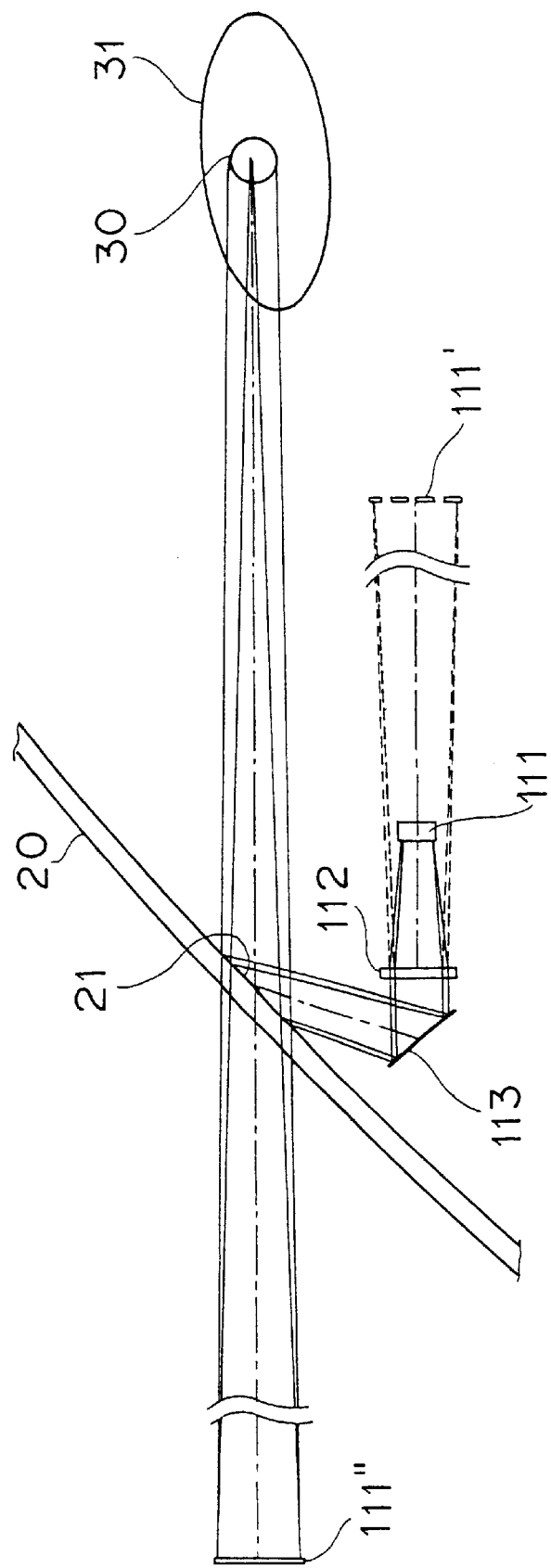
FIG. 10 is a side view of an example of a vehicle-installed head-up display device.
Figure 11:
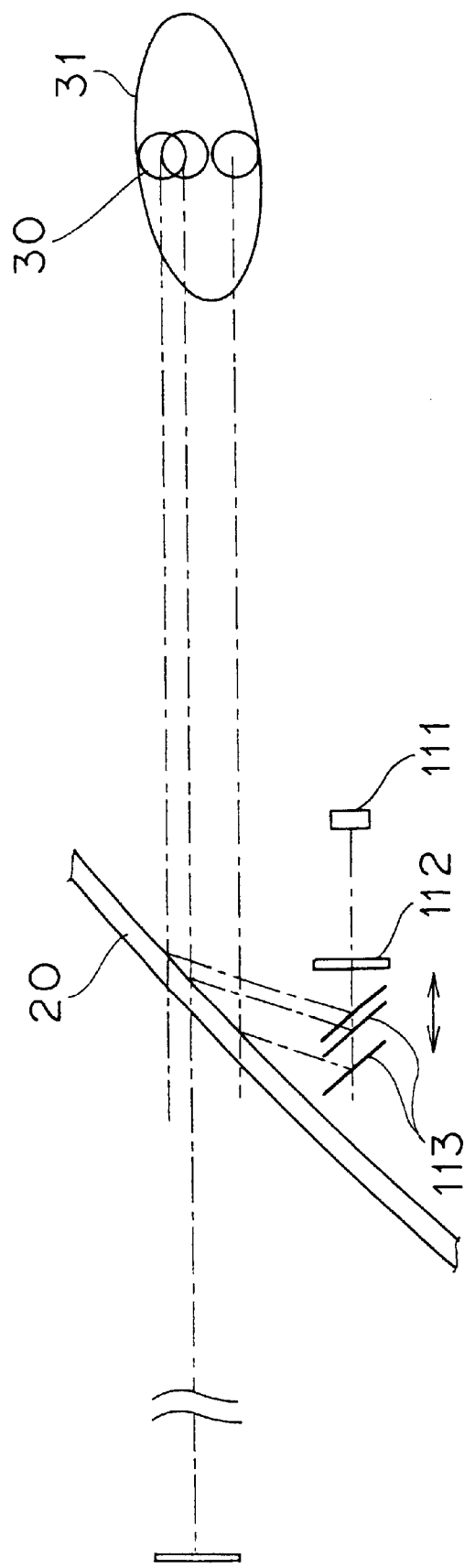
FIG. 11 is a side view showing a vehicle-installed head-up display device of FIG. 10 which incorporates an adjusting mechanism.
Figure 12:
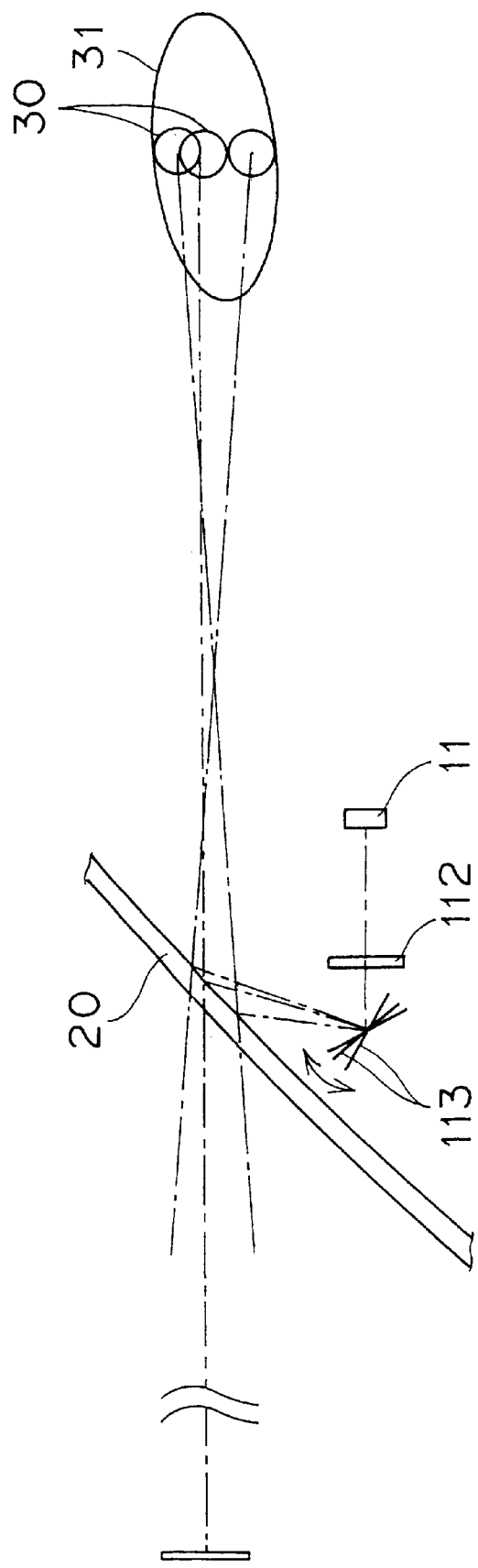
FIG. 12 is a side view showing a vehicle-installed head-up display device of FIG. 10 which incorporates another adjusting mechanism.
Figure 13:
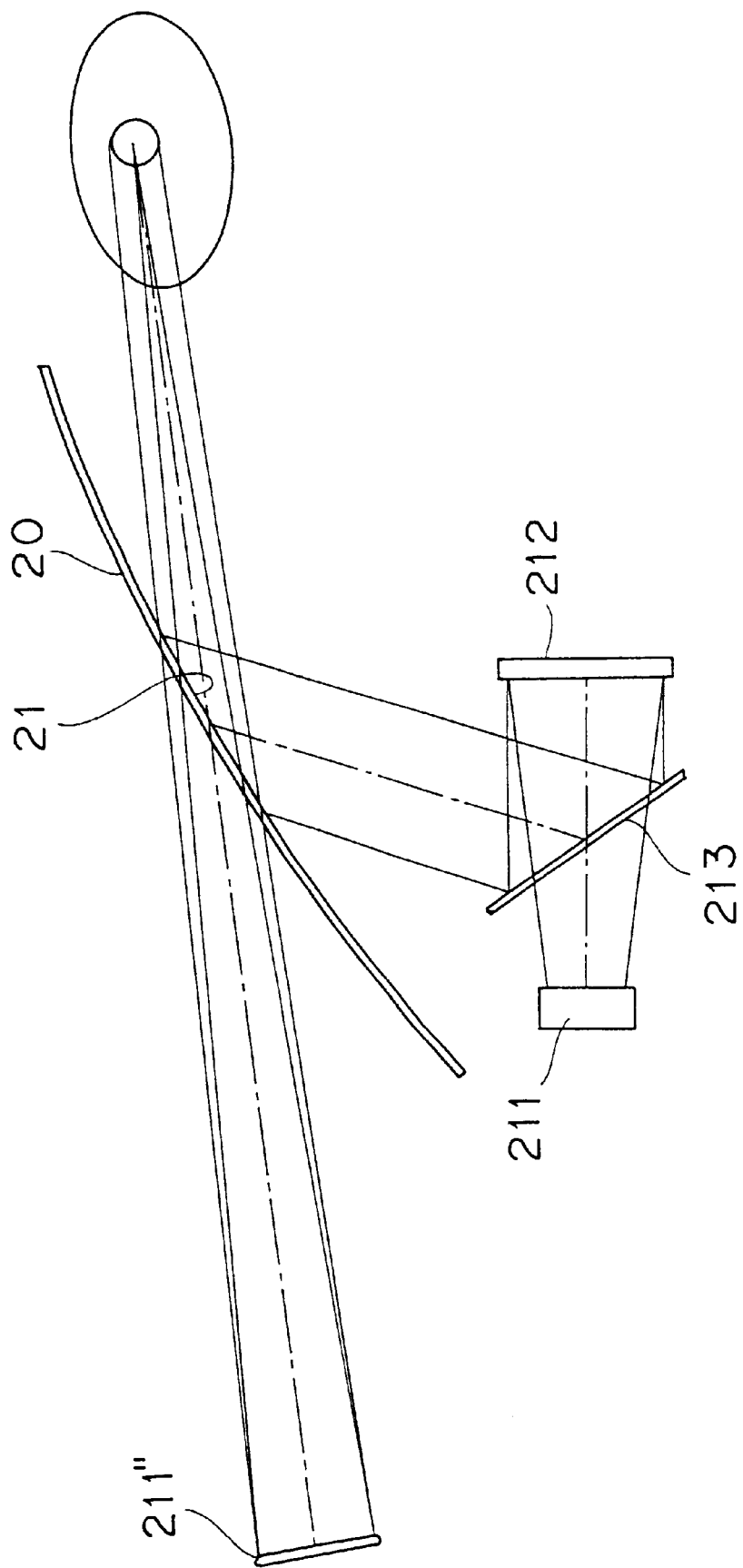
FIG. 13 is a side view of another example of a vehicle-installed head-up display device.

FIG. 9 shows another embodiment of a vehicle-installed head-up display device according to this invention. In FIG. 9, as in the embodiment as shown in FIG. 1, a light-emitting display 11 is installed within a dashboard of a vehicle (not shown) so that the its displaying screen is oriented toward the front of the vehicle. The light-emitting display 11 may be a displaying means such as a liquid crystal or a fluorescent display tube. A reflecting mirror 16 is arranged oppositely to and apart by a prescribed distance from the displaying screen of the display 11. The reflecting mirror 16 may be a concave mirror (intermediate reflecting means) for reflecting the image light from the display 11 toward the displaying screen of the display 11.

A half-mirror 13a' (first translucent reflecting means) and a half-mirror 13b' (second translucent reflecting means) are arranged between the display 11 and the reflecting mirror 16. They are tilted at a prescribed angle to transmit the image light from the display 11 and reflect the image light reflected by the reflecting mirror 16 toward the inner face on the side of the passenger room of the windshield 20 through an opening in the upper face of the dashboard (not shown), respectively. The above inner face is coated with a translucent reflecting film 21. The translucent reflecting film 21 serves as a final reflecting means which reflect two displayed images reflected by the half-mirror 13a' and half-mirror 13b', respectively toward the eyes of the driver within a field of view ahead of the driver's seat.

A liquid crystal shutter (shutter means) 14 is arranged between the half-mirror 13a' and half-mirror 13b' and the translucent reflecting mirror 21. The liquid crystal shutter 14 is opened/closed to control the transmission or non-transmission of the image light reflected by the half-mirrors 13a' and 13b'. The shutter 14 may be the same as employed in the previous embodiment. Namely, the shutter 14 may be composed of the first shutter means 14a and the second shutter means 14b. The first shutter means 14a controls transmission/non-transmission of the image light reflected by the half-mirror 13a' whereas the second shutter means 14b controls transmission/non-transmission of the image light reflected by the half-mirror 13b'.

The image light from display 11 is transmitted by the half-mirror 13a', reflected from the reflecting mirror 16 and further transmitted by the half-mirror 13b'. The half-mirror 13a' reflects the image light thus created toward a first reflective area 21a of the translucent reflecting film 21. The image light from display 11 is also transmitted by the half-mirror 13b' and reflected from the reflecting mirror 16. The half-mirror 13b' reflects the image light thus created toward a second reflective area 21b of the translucent reflecting film 21. The second reflective area 21b is located above the first reflective area. Thus, the two displayed images, one of which is selectively and individually displayed on the single displaying screen of the display 11, are reflected by the two reflective areas of the translucent reflecting film 21.

The one of the displayed images which is finally reflected by the translucent reflecting film 21 is imaged as a virtual image enlarged by the curvature of the windshield and at a position far ahead of the windshield corresponding to the sum of the distances from the display 11 and the reflecting mirror 16, from the reflecting mirror 16 and the half-mirror 13a' and from the half-mirror 13a' to the translucent reflecting film 21. The other of the displayed images which is finally reflected by the translucent reflecting film 21 is imaged as a virtual image enlarged by the curvature of the windshield and at a position far ahead of the windshield corresponding to the sum of the distances from the display 11 and the reflecting mirror 16, from the reflecting mirror 16 and the half-mirror 13b' and from the half-mirror 13b' to the translucent reflecting film 21. The driver can visually recognize these virtual images.

There is a difference between the distance between the half-mirror 13a' and the reflecting mirror 16 and that between the half-mirror 13b' and the reflection mirror 16. If this difference is set to be equal to that between the distance between the half-mirror 13a' and the translucent reflecting film 21 and the half-mirror 13b' and the translucent reflecting film 21, the two displayed images are imaged as virtual images at the same position.

The two images, one of which is displayed selectively and individually on the display 11 may be the same as shown in FIG. 3. When either one of them is displayed on the display 11 at a period shorter than the afterimage time, the liquid crystal shutter 14 is correspondingly opened/closed in the manner explained in connection with the embodiment of FIG. 3. Thus, the two displayed images are reflected three times by the reflecting mirror 16, half-mirrors 13a', 13b and reflective areas 21a, 21b and flipped vertically so that they are visually recognized as a single visual image ahead of the windshield by the driver.

Although not shown, the adjusting mechanism for setting the visible range within the eye range, which has been explained with reference to FIGS. 6 to 8, can be also applied to this embodiment.

In the embodiment described with reference to FIG. 9, the luminance of the displayed image after having been reflected by the half-mirror 13a' is preferably equal to that of the displayed image after having been reflected by the half-mirror 13b'. Therefore, assuming that the displaying luminance of the display 11 is Ho, the reflectance of the reflecting mirror 16 is R, the transmissivity of the half-mirror 13a' is Ct, reflectance thereof is Cr, the transmissivity of the half-mirror 13b' is Dt and the reflectance thereof is Dr, R, Cr, Ct, Dr and Dt are preferably set so that Ho×Ct×Dt×R×Dt×Cr= Ho×Ct×Dt×R×Dr. For example, if Cr=30%, Ct=70%, Dr=40% and R=100, the luminance of the one image is 12.6% whereas the other image is 11.76%. These luminances are approximately equal to each other.

In FIG. 9, the light emitting display 211, reflecting mirror 212 and translucent reflecting plate 213 which are used in the conventional display device are also illustrated. As understood from the comparison of these elements and the elements in this invention, the entire size of the display device according to this invention can be greatly reduced to be as half as that of the conventional display device (For example, the height of the display can be reduced from H to h).

Incidentally, the contents of Japanese Patent Appln. No. 2001-216474 filed on Jul. 17, 2001 are hereby incorporated by reference.

What is claimed is:

1. A vehicle-installed head-up display device comprising:
   final reflecting means located in a field of view ahead of a driver's seat, said final reflecting means being translucent;
   displaying means capable of selectively displaying one of first and second images by light emission on a signal displaying screen;
   first reflecting means for reflecting light of a displayed image toward a first reflective area of said final reflecting means;
   second reflecting means for reflecting light of the displayed image toward a second reflective area of said final reflecting means, said second reflective area being adjacent to said first reflective area; and
   optical path exchanging means for exchanging an optical path so that when the first image is displayed by said displaying means, only the light of the first image reflected by the first reflecting means is incident on the first reflective area, whereas when the second image is displayed by said displaying means, only the light of the second image reflected by the second reflecting means is incident on the second reflective area, wherein
   said first and second images one of which is selectively displayed are reflected by said first reflective area and said second reflective area of said final reflecting means so that a driver can visually recognize these images as virtual images ahead of a windshield.

2. A vehicle-installed head-up display device according to claim 1, wherein selective display of said first and second displayed images is made in a period shorter that the afterimage of eyes, and in synchronism with the selective display, the optical path is exchanged by said optical path changing means, whereby the displayed images are visually recognized as a single virtual image.

3. A vehicle-installed head-up display device comprising:
   final reflecting means located in a field of view ahead of a driver's seat, said final reflecting means being translucent;
   displaying means capable of selectively displaying one of two images by light emission on a single displaying screen;
   first reflecting means for reflecting light of a displayed image toward a first reflective area of said final reflecting means;
   second reflecting means for transmitting a part of light of the displayed image and reflecting the remainder of the light toward a second reflective area of said final reflecting means, said second reflecting means being located between said first reflecting means and said displaying means, said second reflective area being adjacent to said first reflective area, and said second reflecting means being translucent;
   first shutter means for controlling transmission/non-transmission of the light of the displayed image reflected by said first reflecting means; and
   second shutter means for controlling transmission/non-transmission of the light of the displayed image reflected by said second reflecting means, wherein
   one of said first shutter means and second shutter means is opened and the other thereof is closed according to each image selectively displayed by said displaying means, and the displayed image transmitted by the first shutter means or the second shutter means is reflected by said first reflective area or said second reflective area so that a driver can visually recognize the displayed image as a virtual image ahead of a windshield.

4. A vehicle-installed head-up display device according to claim 3, wherein
   said first shutter means is located between said first reflecting means and said first area of the final reflecting means, and
   said second shutter means is located between said second reflecting means and said second area of the final reflecting means.

5. A vehicle-installed head-up display device according to claim 3, further comprising enlarging optical means located between said displaying means and said second reflecting means.

6. A vehicle-installed head-up display device according to claim 3, wherein
   the two displayed images are upper and lower elements divided from a single image,
   when the upper element is displayed by said displaying means, the first shutter means is closed and the second shutter means is opened, whereas the lower upper element is displayed by said displaying means, the first shutter means is opened and the second shutter means is closed, and
   relative positions of said first reflecting means and said second reflecting means are located so that these upper and lower elements are imaged as an single integral virtual image.

7. A vehicle-installed head-up display device according to claim 6, wherein a lower end point of the displayed image reflected by said first reflecting means and an upper point of that reflected by said second reflecting means accord to each other in their reflecting optical paths.

8. A vehicle-installed head-up display device according to claim 7, further comprising:
   means for adjusting the directions of the light of the displayed images reflected by the first reflecting means and the second reflecting means toward the final reflecting means so that the position of the virtual image to be visually recognized ahead of the windshield is adjusted; and means for adjusting the position of said shutter means so that the transmission/non-transmission of the light of the displayed images can be controlled.

9. A vehicle-installed head-up display device comprising:

final reflecting means located in a field of view ahead of a driver's seat, said final reflecting means being translucent;

displaying means capable of selectively displaying one of first and second images by light emission on a signal displaying screen;

intermediate reflecting means for reflecting light of the displayed image;

first translucent reflecting means for reflecting light of a displayed image toward a first reflective area of said final reflecting means, said first translucent reflecting means being located between said displaying means and said intermediate reflecting means;

second translucent reflecting means for reflecting light of the displayed image toward a second reflective area of said final reflecting means, said second reflective area being adjacent to said first reflective area, said second translucent reflecting means being located between said displaying means and said intermediate reflecting means; and first shutter means for controlling transmission/non-transmission of the light of the displayed image reflected by said first translucent reflecting means;

second shutter means for controlling transmission/non-transmission of the light of the displayed image reflected by said second translucent reflecting means, wherein said shutter means is opened or closed according to the image displayed selectively by said displaying means and said image is reflected by said first reflective area or said second reflective area of the final reflecting means so that a driver can visually recognize the displayed image as a virtual image ahead of a windshield.

10. A vehicle-installed head-up display device according to claim 9, wherein said intermediate reflecting means is a concave mirror.

11. A vehicle-installed head-up display device according to claim 9, wherein said first shutter means is located between said first translucent reflecting means and said first area of the final reflecting means, and said second shutter means is located between said second translucent reflecting means and said second area of the final reflecting means.

* * * * *